United States Patent

[11] 3,565,135

| [72] | Inventors | Francis J. Rosenthal, Jr.<br>Fork;<br>Leonard U. Alsruhe, Towson, Md. |
|---|---|---|
| [21] | Appl. No. | 815,376 |
| [22] | Filed | Apr. 11, 1969 |
| [45] | Patented | Feb. 23, 1971 |
| [73] | Assignee | The Black and Decker Manufacturing Company<br>Towson, Md. |

[54] MITER ADJUSTMENT FOR RADIAL-ARM SAW
15 Claims, 5 Drawing Figs.

[52] U.S. Cl. ................................................ 143/6
[51] Int. Cl. ................................................ B27b 5/20
[50] Field of Search ............................................ 143/6—1,
47-6; 83/47—6, 581

[56] References Cited
UNITED STATES PATENTS

| 2,835,285 | 5/1958 | Gardner .................... | 143/6 |
| 3,092,154 | 6/1963 | Dobslaw .................... | 143/6 |
| 3,123,108 | 3/1964 | Gaskell et al. ............... | 143/6 |

Primary Examiner—Donald R. Schran
Attorneys—Leonard Bloom and Joseph R. Slotnik

ABSTRACT: Disclosed herein is a radial-arm saw having a base with an upstanding column pivoted thereon about a vertical axis. An arm rigid with the column extends over a worktable on the base and has a circular saw suspended therefrom by means of a traveling carriage. Means is provided to accurately index the column to selected pivoted positions relative to the base, and that means provides adjustment whereby to accurately locate the index positions.

PATENTED FEB 23 1971
3,565,135
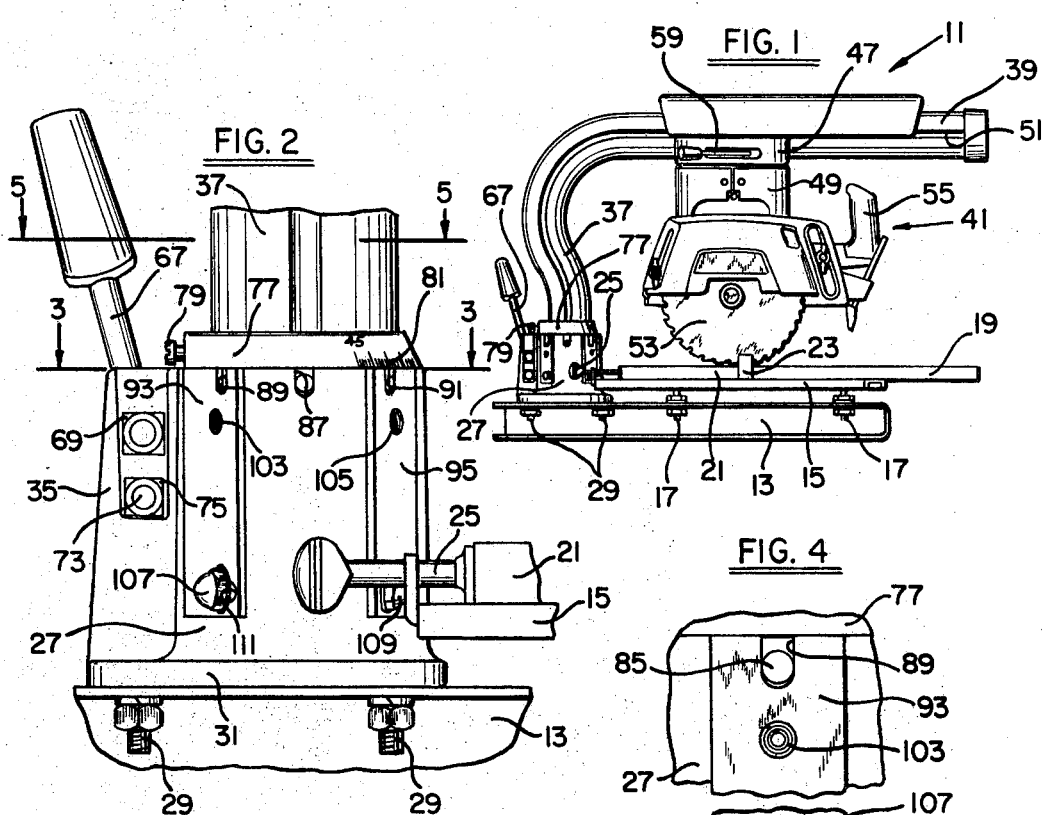
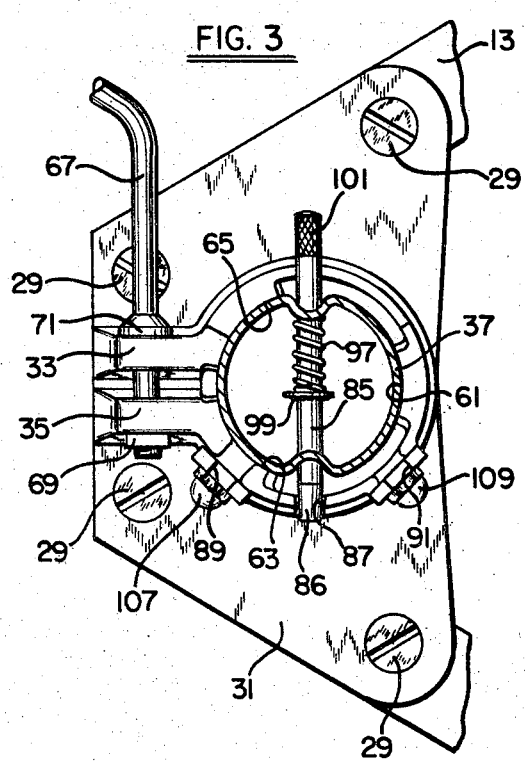
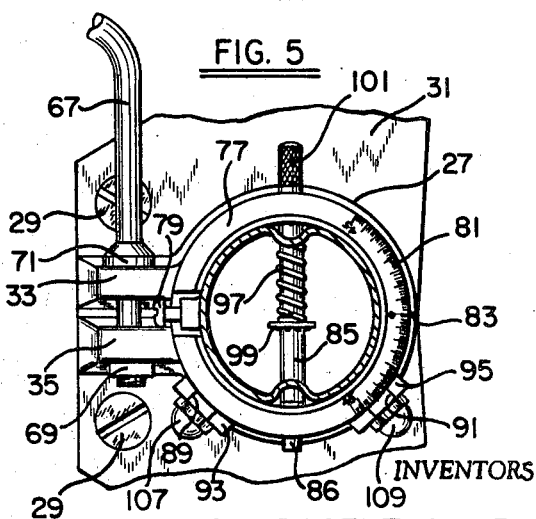
INVENTORS
FRANCIS J. ROSENTHAL, JR.
LEONARD U. ALSRUHE
BY Joseph R. Slotnik
ATTORNEY

3,565,135

MITER ADJUSTMENT FOR RADIAL-ARM SAW

SUMMARY OF THE INVENTION

The present invention is directed to provide, in a radial-arm saw, an accurate and inexpensive supporting and positioning construction for a column upon a base. This construction provides a rigid support and a positive index for the column in a plurality of pivoted positions, is readily adjustable to accommodate manufacturing tolerances, and facilitates quick and easy repositioning of the column from one of said positions to another. An arm which supports the saw is rigid with the column, so that thereby is provided accurate positioning of the column (and arm) for selected cutting positions.

Main objects of the present invention, therefore, are to provide a novel column supporting construction in a radial-arm saw which rigidly supports the column in a plurality of pivoted positions relative to a base, and which positively and accurately locates the column in said positions.

Further important objects of the invention are to provide a novel column supporting and locating construction of the above character which facilitates easy relocation of the column from one pivoted position to the other and which provides for easy adjustment to compensate for manufacturing tolerances.

Additional important objects of the invention are to provide a novel construction of the above character which is relatively inexpensive to manufacture, rugged in construction, and reliable in use.

Further objects and advantages of the invention will become more apparent from a consideration of the detailed description to follow taken in conjunction with the drawings annexed hereto.

BRIEF DESCRIPTION OF THE DRAWINGS

FIG. 1 is a side elevational view illustrating a radial-arm saw embodying the present invention;

FIG. 2 is an enlarged view of a portion of FIG. 1 illustrating the position of the parts for crosscutting;

FIG. 3 is a sectional view of FIG. 2 taken along the line 3–3 thereof;

FIG. 4 is an enlarged view of a portion of FIG. 2 and showing the relation of the parts in one bevel cutting position; and FIG. 5 is a sectional view of FIG. 2 taken along the line 5–5 thereof.

BROAD STATEMENT OF THE INVENTION

Broadly described, the present invention relates to a radial-arm saw construction comprising a base having a horizontal worktable supported thereon, support means on said base, a column pivotally mounted on said support means for movement about a generally vertical axis, an arm rigid with said column and extending over said worktable and having a circular saw suspended therefrom for travel therealong, manually releasable means for positively locating said column in selected pivoted positions, said manually releasable means including detent members on said column and said support means and cooperable when said column is in said selected pivoted positions, and means for independently adjusting at least some of said detent members relative to the other detent members to accurately locate said selected positions.

In another aspect, the present invention relates to a pivotal support and locking mechanism for a one-piece tubular column and arm of a radial-arm saw, said mechanism comprising an upstanding collar mounted on a base, said column having a lower portion supported within said collar for pivotal movement about a generally vertical axis, means carried by said column and cooperable with means on said collar for positively locating said column in a plurality of selected pivotal positions, said means on said column being manually releasable, at least some of said means on said column and said collar being independently adjustable relative to the other of said means, whereby to accurately locate said pivotal positions.

In still another aspect, the present invention relates to a radial-arm saw including a base having a horizontal worktable positions thereon, arm means including a portion suspended over and generally parallel to said table, a saw carriage supported by said arm portion for travel therealong and having a circular saw carried thereby, support means fixed relative to said base and supporting said arm means for pivotal movement about a generally vertical axis, cooperable means on said support means for positively positioning said arm means in preselected pivoted positions, at least some of said cooperable means being independently adjustable relative to the other of said cooperable means to adjust said positions, and means on said support means for releasably clamping said arm means in a variety of pivoted positions.

DETAILED DESCRIPTION

Referring now more specifically to the drawings, a radial-arm saw embodying the present invention is illustrated generally at 11 in FIG. 1 and is seen to include a pair of base frames 13 with a pair of cleats 15 (only one of which is shown) secured thereto by fasteners 17. A worktable has a stationary portion 19 secured to the cleats 15 and a removable portion 21 held against a work fence 23 by a plurality of clamps 25 (only one of which is shown).

Turning now to FIGS. 2 and 3, it is seen that the base frames 13 have a support or collar 27 secured thereto by fasteners 29. These fasteners 29 extend through the base frame 13 and a flange plate 31 formed integrally with the collar 27. The collar 27 is generally cylindrical in configuration, being split along most of its length for a purpose to be described, and has a pair of confronting radial flanges 33, 35 formed at the split edges.

Arm means, including a one-piece column 37 and radial arm 39 has its lower end received in and supported by the collar 27. The arm 39 extends over and is parallel to the worktable 19, 21 and has a circular saw 41 suspended therefrom by means of a saw carriage 57 and a yoke 49. The saw carriage 47 is adapted to move longitudinally of the arm 39 by means of linear ball bearings (not shown) which ride in grooves or bearing races 51 (only one of which is shown) in the arm 39.

The circular saw 41 includes a motor-powered blade 53 and the saw 41 and carriage 47 are moved along the arm 39 by means of an operator handle 55. The saw frame yoke 49 and carriage 47 are pivotally connected so that the yoke 49 and saw 41 can swivel about a generally vertical axis to accommodate both "crosscutting" and "ripping." A lever 59 is provided to selectively lock and free the frame 49 relative to the carriage 47.

It is desirable that the arm 39 be pivotal over the worktable to accommodate right-angle crosscutting and various miter cuts. To this end, the column 37 is generally cylindrical in cross section and is adapted to picot about a generally vertical or upstanding axis within the collar 27. A plurality of machined arcuate seats 61, 63, 65 are formed interiorly of the collar 27 to provide bearing seats for the column 37. When it is desired to secure the column 37 (and arm 39) in place, the collar flanges 33, 35 are drawn together by means of a clamp lever 67. As shown in FIGS. 2 and 3, the clamp lever 67 extends through the collar flanges 33, 35 and has one end threaded into a nut 69 trapped in the flange 35 while an enlargement 71 on the lever 67 bears against the flange 33. Another bolt 73 and trapped nut 75 hold the flanges 33, 35 against spreading apart too far when the clamp lever 67 is unthreaded.

In order to accurately determine the position of the arm 39 relative to the fence 23, a miter scale 77 is mounted atop the collar 27 and is secured to the column 37 by means of a setscrew 79. The scale 77 has indicia 81 thereon which align with a reference line 83 on the collar.

In general, the most frequent miter cuts made are at 45° in either direction from the fence 23. Thus, it is desirable that the arm 39 and column 37 must be quickly and accurately located in or indexed to these two locations as well as in a location for right-angle crosscutting (and ripping). To this end, a latch comprising a miter detent pin 85 is slidably carried by the column 37 and extends to either side thereof. The pin 85 has a tapered end 86 selectively receivable in an opening 87 formed in the collar 27 or in openings 89, 91 formed in miter plates 93, 95, respectively. The tapered end 86 helps eliminate play and adjusts for wear between the pin 85 and the openings 87, 89, 91.

A compression spring 97 on the pin 85 is caged between a retaining ring 99 frictionally held in the pin 85, and the interior of the column. The spring 97 normally biases the end 86 of the pin 85 toward the openings 87, 89, 91. A knurled portion 101 at the other end of the pin 85 facilitates manual withdrawal thereof against the force of spring 97.

The opening 87 in the collar 27 is located so that when the pin 85 is positioned therein, as shown in FIGS. 2, 3 and 5, the arm 39 is in position for right-angle crosscutting (or ripping). The openings 89, 91 in the miter plates 93, 95 are located so that when the pin 85 is positioned therein, the arm 39 is in position for 45° miter cutting, right and left, respectively. The opening 87 is machined in the collar 27 and is the reference point. The miter plates 93, 95 are pivoted on the collar by pins 103, 105 and are locked in position by nuts 107, 109 threaded on the ends of screws (not shown) which extend through elongated slots 111, 113, respectively. Thus, by loosening the nuts 107, 109 and pivoting the miter plates 93, 95 about the pivot pins 103, 105, the location of the tapered openings 89, 91 are adjustable to take up tolerance variations in the parts and provide accurate positioning of the arm 39 for miter cutting.

In use, the column 37 and arm 39 are locked in position within the collar 27 by drawing the flanges 33, 35 together by means of the locking lever 67 and nut 69. If the arm 39 is in position for right-angle crosscutting (or ripping), or 45° miter cutting right or left, then the end 86 of pin 85 is positioned in openings 87, 89 or 91, accordingly. When it is desired to reposition the arm 39 for a different cut, the collar 27 is released from the column 37 by unthreading the lever 67 and the pin 85 is withdrawn by pulling on the knurled end 101. The arm 39 is then repositioned, the pin 85 released, and the locking lever 67 turned to draw up on the flanges 33, 35.

It will be appreciated that the arm 39 can be positioned in virtually any miter position other than the 45° positions described. In that case, the pin 85 bears against the interior of the collar 27. The locking lever 67, however, performs its locking function on the column 37 as described above.

By the foregoing, there is provided a novel column support and miter adjustment construction for a radial-arm saw calculated to fulfill the objects hereinabove set forth, and while a preferred embodiment has been set forth hereinabove, various additions, substitutions, modifications and omissions may be made thereto without departing from the spirit of the invention as encompassed by the appended claims.

We claim:

1. A radial-arm saw construction comprising a base having a horizontal worktable supported thereon, support means on said base, a column pivotally mounted on said support means for movement about a generally vertical axis, an arm rigid with said column and extending over said worktable and having a circular saw suspended therefrom for travel therealong, manually releasable means for positively locating said column in selected pivoted positions, said manually releasable means including detent members on said column and said support means and cooperable when said column is in said selected pivoted positions, and means for independently adjusting at least some of said detent members relative to the other of said detent members to accurately locate said selected positions.

2. A construction as defined in claim 1 wherein said support means comprises a split collar on said base pivotally receiving said collar, and releasable means for drawing said split collar tightly around said column, whereby to lock said column and arm relative to said base.

3. A construction as defined in claim 1 which includes releasable means for locking said column to said support means in a variety of pivoted positions.

4. A construction as defined in claim 3 wherein said detent members include a member mounted on said column and movable pivotally therewith, said support means having spaced means cooperable with said member on said column when said column is in said selected positions, at least some of said spaced means being independently adjustable relative to said support means and to the other of said spaced means.

5. A construction as defined in claim 4 wherein said member comprises a pin slidable transversely of said column, said spaced means on said support means including spaced recesses adapted to receive said pin.

6. A construction as defined in claim 4 which includes means normally biasing said member toward cooperable engagement with said spaced means.

7. A construction as defined in claim 1 wherein said detent members include a pin carried by said column and movable laterally thereof, said support means including a collar having at least one recess therein adapted to receive said pin in one pivoted position of said column, at least one plate adjustably mounted on said collar and having a recess therein adapted to receive said pin in another pivoted position of said column.

8. A construction as defined in claim 7 wherein said plate is pivoted on said collar to adjust the position of its recess.

9. A construction as defined in claim 7 which includes a pair of said plates mounted on said collar at spaced locations, said plates each being pivotally adjustable to adjust the position of its respective recess.

10. A pivotal support and locking mechanism for a one-piece tubular column and arm of a radial-arm saw, and mechanism comprising an upstanding collar mounted on a base, said column having a lower portion supported within said collar for pivotal movement about a generally vertical axis, means carried by said column and cooperable with means on said collar for positively locating said column in a plurality of selected pivotal positions, said means on said column being manually releasable, at least some of said means on said column and said collar being independently adjustable relative to the other of said means, whereby to accurately locate said pivotal positions.

11. A mechanism as defined in claim 10 wherein means on said column includes a latch normally biased toward cooperative engagement with said means on said collar, said means on said collar including means defining a plurality of recesses adapted to receive said latch in said selected pivotal positions of said column.

12. A mechanism as defined in claim 10 wherein said means on said column includes a pin on said column movable pivotally therewith and slidable relative thereto, said means on said collar including a plurality of members independently adjustable mounted on said collar and each having a recess adapted to receive said pin.

13. A mechanism as defined in claim 12 wherein said plurality of members are pivotally adjustable relative to said collar.

14. A mechanism as defined in claim 12 wherein said collar has one recess formed directly therein adapted to receive said pin.

15. A radial-arm saw including a base having a horizontal worktable positioned thereon, arm means including a portion suspended over and generally parallel to said table, a saw carriage supported by said arm portion for travel therealong and having a circular saw carried thereby, support means fixed relative to said base and supporting said arm means for pivotal movement about a generally vertical axis, cooperable means on said support means for positively positioning said arm means in preselected pivoted positions, at least some of said cooperable means being independently adjustable relative to the other of said cooperative means to adjust said positions, and means on said support means for releasably clamping said arm means in a variety of pivoted positions.